(12) United States Patent
Schornig et al.

(10) Patent No.: US 12,047,425 B1
(45) Date of Patent: Jul. 23, 2024

(54) COGNITIVE NETWORKING USING A DEVICE ENDPOINT AGENT

(71) Applicant: Cisco Technology, Inc., San Jose, CA (US)

(72) Inventors: Eduard Schornig, Haarlem (NL); Jean-Philippe Vasseur, Combloux (FR); Grégory Mermoud, Venthône (CH); Michal Wladyslaw Garcarz, Cracow (PL); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/198,565

(22) Filed: May 17, 2023

(51) Int. Cl.
  *H04L 65/102* (2022.01)
  *H04L 41/147* (2022.01)
  *H04L 45/24* (2022.01)

(52) U.S. Cl.
  CPC .......... *H04L 65/102* (2013.01); *H04L 41/147* (2013.01); *H04L 45/24* (2013.01)

(58) Field of Classification Search
  CPC ...... H04L 65/102; H04L 41/147; H04L 45/24
  See application file for complete search history.

(56) References Cited

U.S. PATENT DOCUMENTS

| | | | |
|---|---|---|---|
| 10,015,688 B2 | 7/2018 | Heikkilä et al. | |
| 11,438,781 B2 | 9/2022 | Lau et al. | |
| 2006/0182034 A1* | 8/2006 | Klinker | H04L 45/3065 370/248 |
| 2019/0007949 A1* | 1/2019 | Myers, III | H04W 36/165 |
| 2019/0182124 A1* | 6/2019 | Jeuk | H04L 43/08 |
| 2020/0267588 A1* | 8/2020 | Lau | H04L 41/5025 |
| 2022/0278889 A1 | 9/2022 | Malleshaiah et al. | |

FOREIGN PATENT DOCUMENTS

| | | |
|---|---|---|
| CN | 111831513 A | 10/2020 |
| EP | 2811719 A1 | 12/2014 |

* cited by examiner

*Primary Examiner* — Nicholas P Celani
(74) *Attorney, Agent, or Firm* — BEHMKE INNOVATION GROUP LLC; James M. Behmke; James J. Wong

(57) ABSTRACT

In one embodiment, a device makes a determination that user application experience is degraded for a client endpoint of an online application due to a current path in a network that conveys application traffic associated with the online application. A device identifies a bypass path in the network for the application traffic. The device provisions an optimization gateway along the bypass path to forward the application traffic from the client endpoint to the online application. The device causes an endpoint agent executed by the client endpoint to send the application traffic to the optimization gateway for forwarding to the online application via the bypass path.

18 Claims, 13 Drawing Sheets

COGNITIVE NETWORKING USING A DEVICE ENDPOINT AGENT

TECHNICAL FIELD

The present disclosure relates generally to computer networks, and, more particularly, to cognitive networking using a device endpoint agent.

BACKGROUND

For decades, computer networks have used Key Performance Indicator (KPIs) such as delay, loss, and jitter as proxies for the true user experience of online applications. More specifically, network administrators typically set different Service Level Agreements (SLAs) for different applications, under the assumption that there are certain KPI thresholds at which the user experience of an application becomes degraded. For instance, a voice application may be considered to give poor user experience when it violates an SLA such as: latency>300 ms or loss>3% or jitter>50 ms.

However, the link between different SLA thresholds and degraded application experience is often debatable and the granularity of the KPIs also makes the measured values largely irrelevant for this purpose. For instance, a network path experiencing a constant delay of 120 ms for a voice application over a period of ten minutes provides a very different user experience than a path with the same average delay that keeps varying between 20 ms and 450 ms. In other words, simply relying on traditional KPIs to detect degraded application experience is not enough, in many instances.

Further, even when the network is able to correctly identify degraded application experience, another challenge that remains is the appropriate network action that should be taken, to mitigate the degradation. For instance, determining that voice quality is low along a highly congested path may be relatively easy. However, determining the correct amount of bandwidth to allocate to the path or the appropriate queue weight for the traffic of the application still remains quite challenging.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
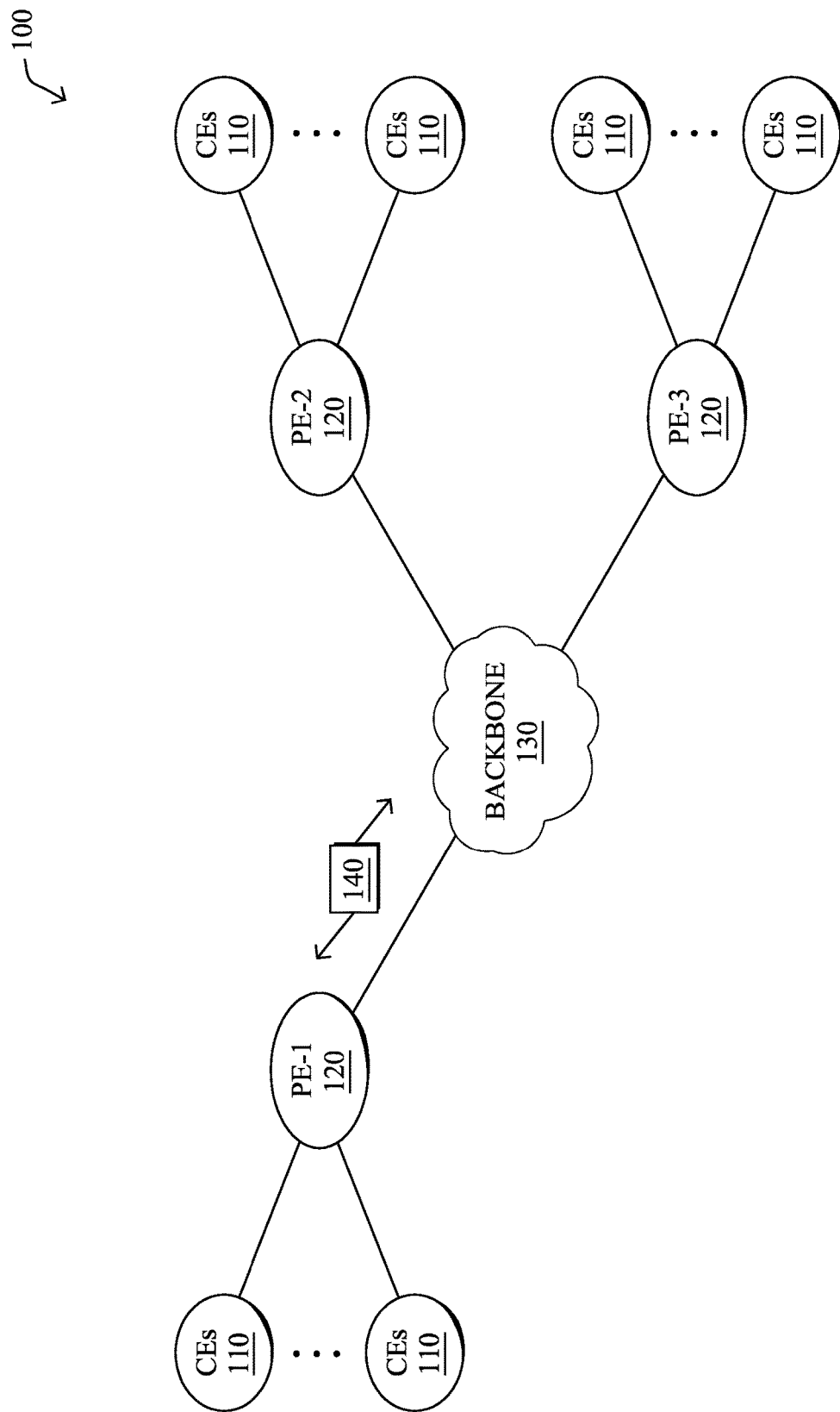
FIGS. 1A-1B illustrate an example communication network.

According to one or more embodiments of the disclosure, a device makes a determination that user application experience is degraded for a client endpoint of an online application due to a current path in a network that conveys application traffic associated with the online application. A device identifies a bypass path in the network for the application traffic. The device provisions an optimization gateway along the bypass path to forward the application traffic from the client endpoint to the online application. The device causes an endpoint agent executed by the client endpoint to send the application traffic to the optimization gateway for forwarding to the online application via the bypass path.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
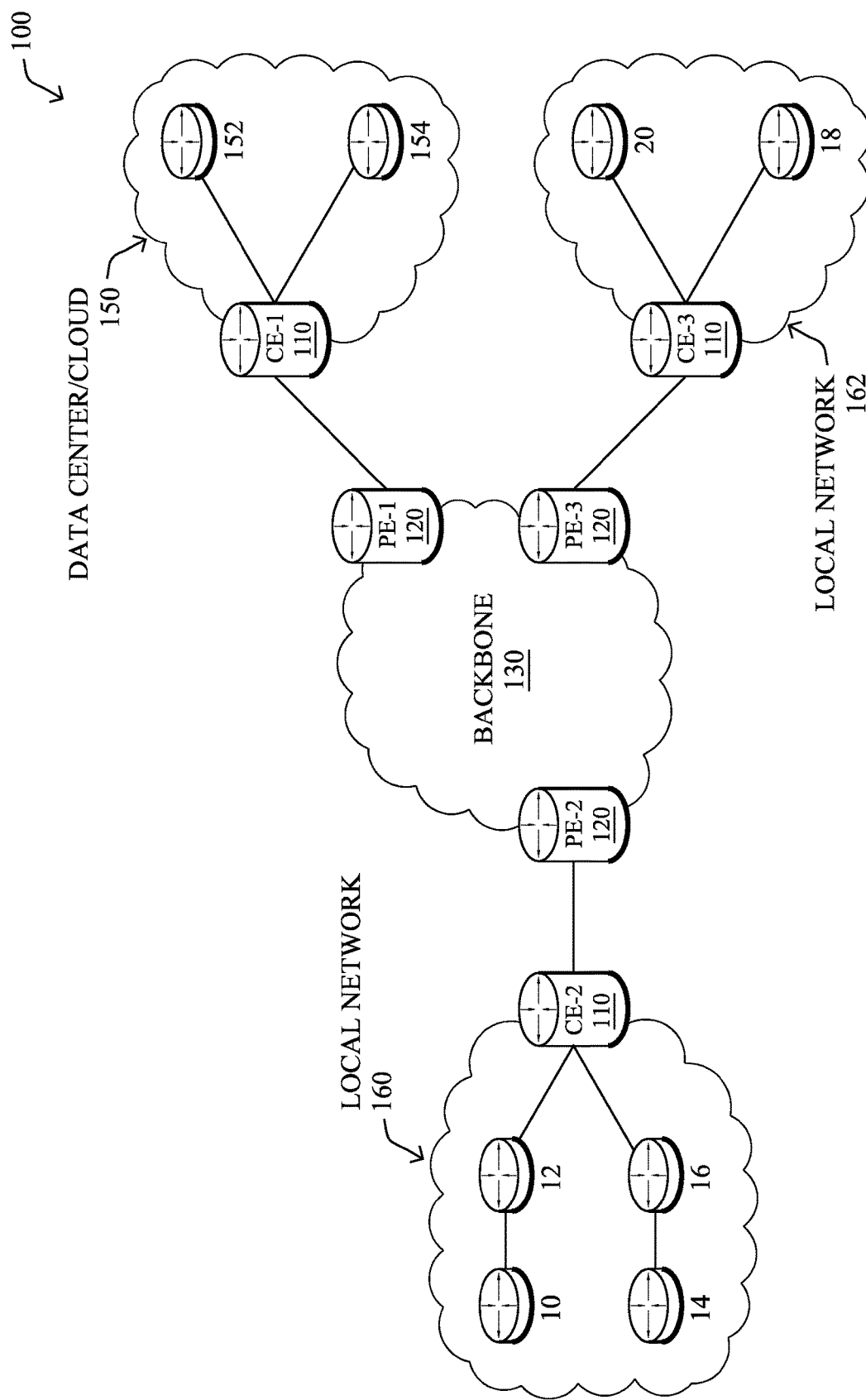

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
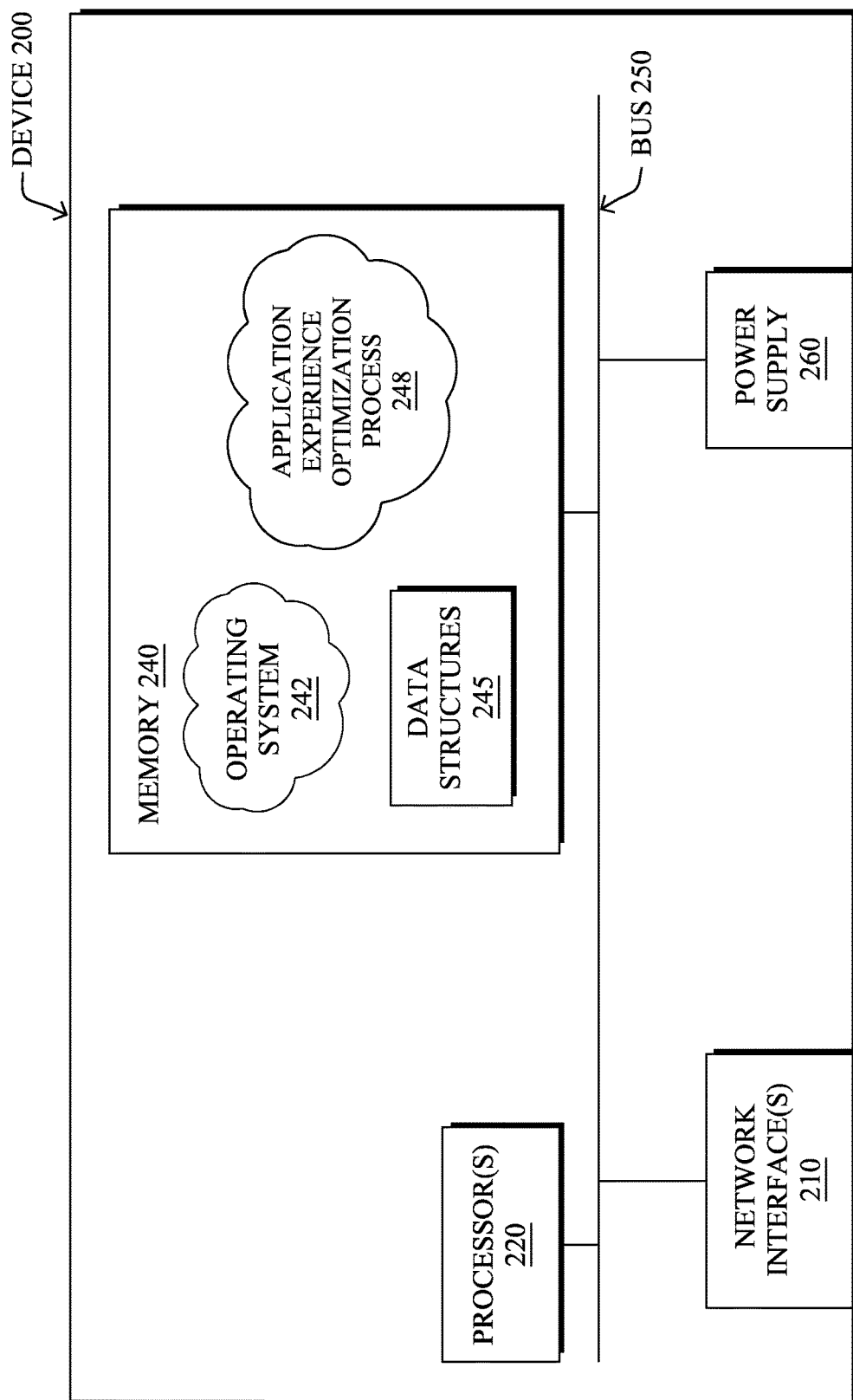
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
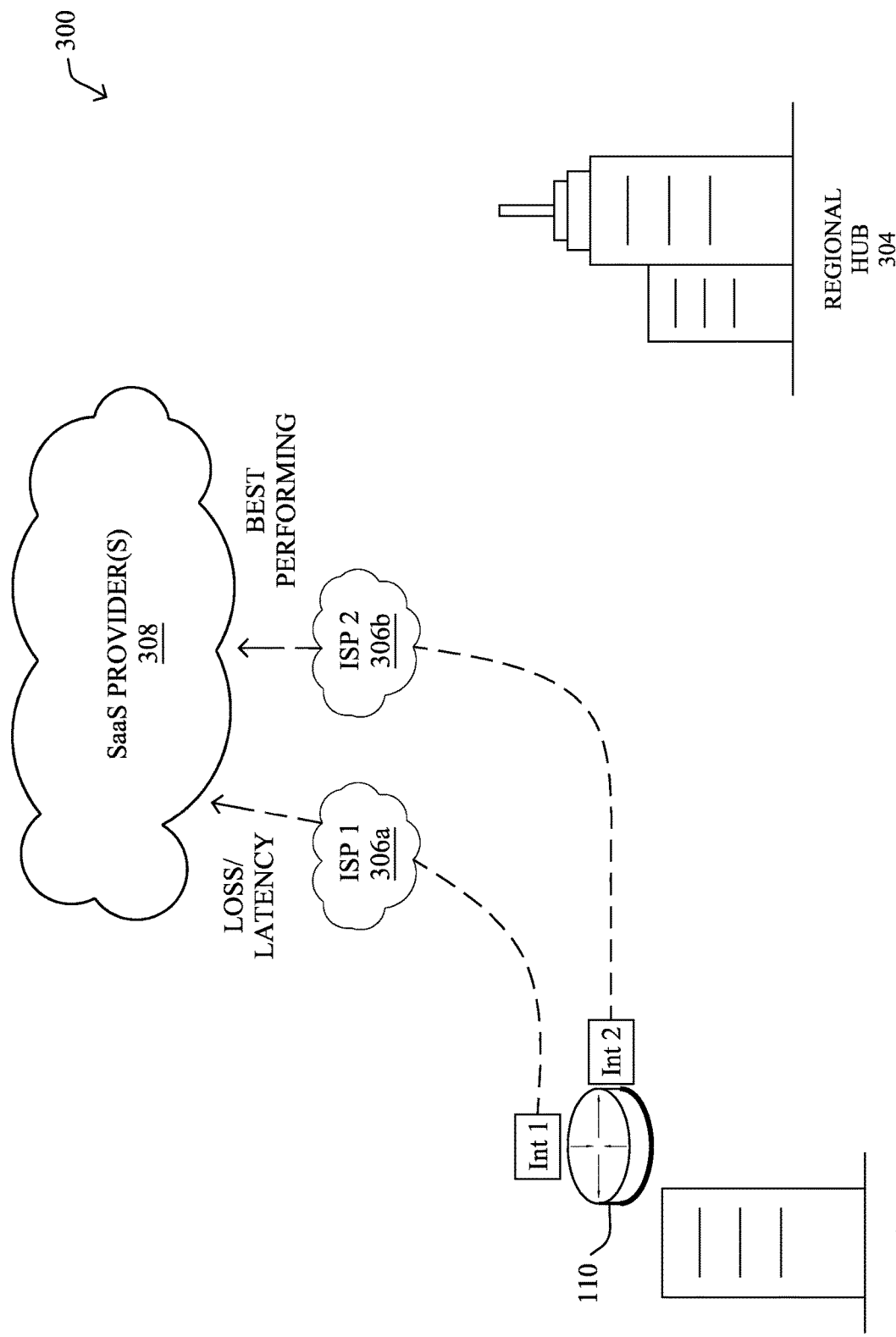
FIGS. 3A-3B illustrate example network deployments.
Figure 3B:
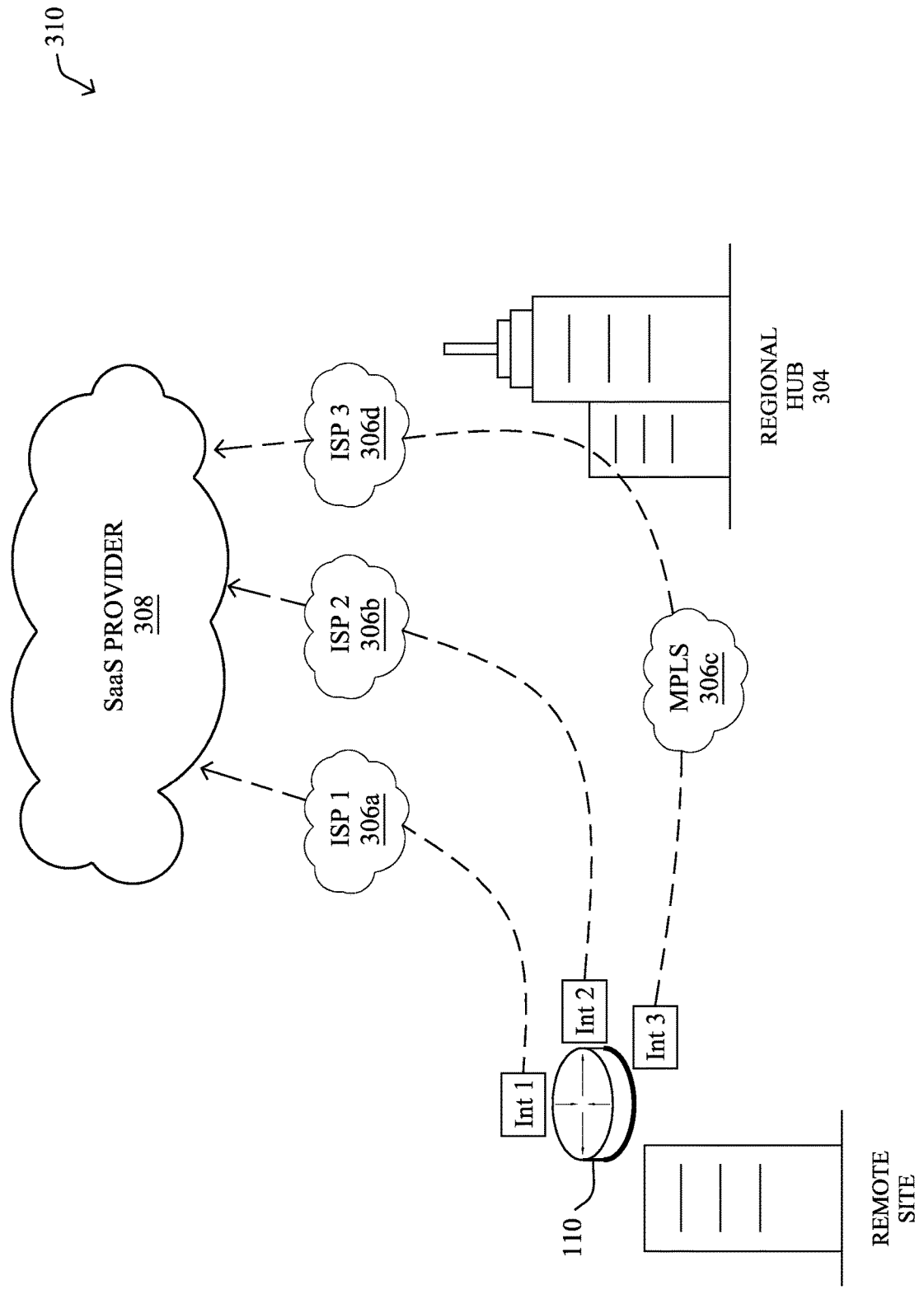

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet. MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
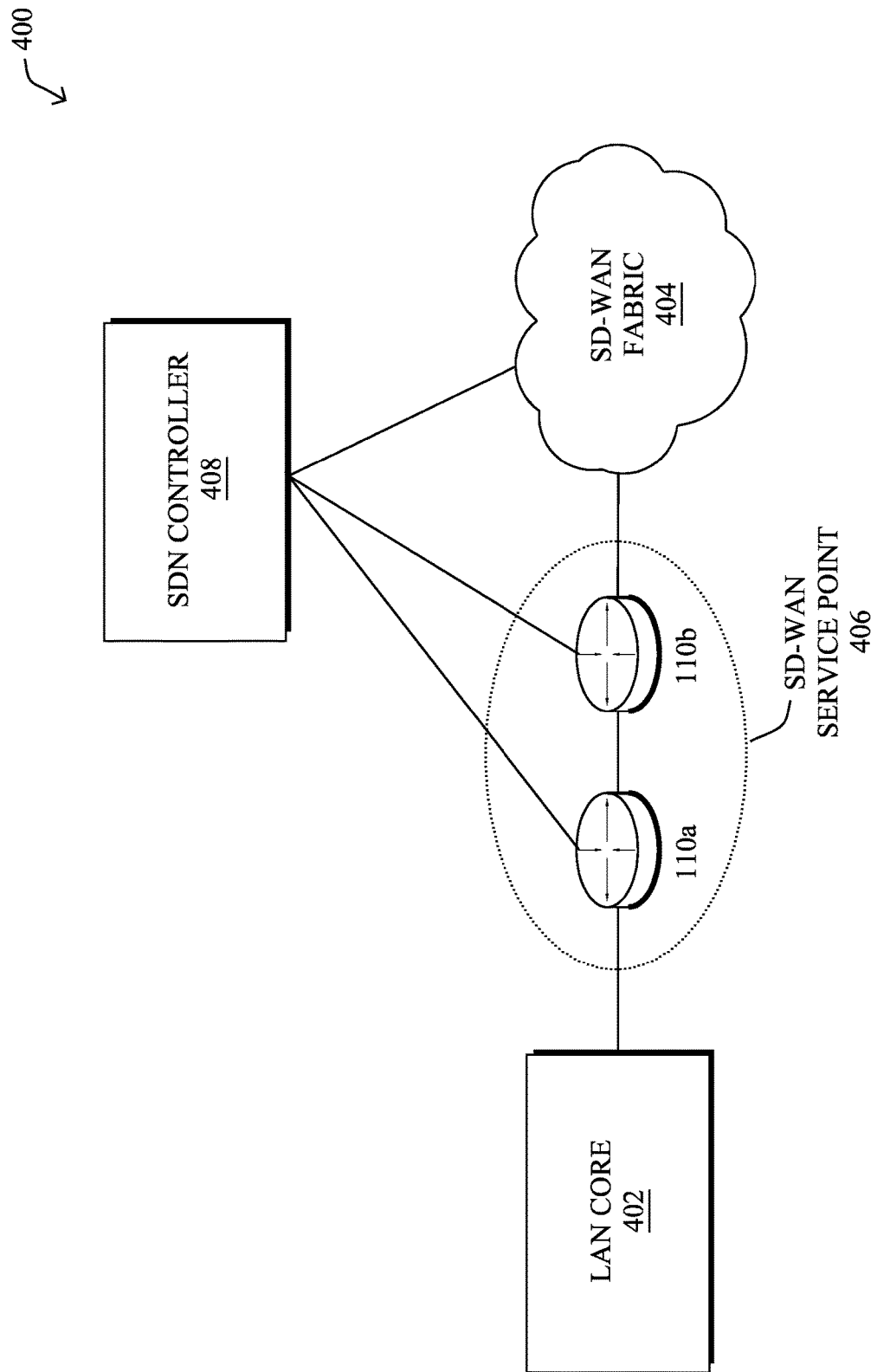
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region. SP, access type, as well as over time with high granularity. The immediate consequence is that the environment is highly dynamic due to:

New in-house applications being deployed;
New SaaS applications being deployed everywhere in the network, hosted by a number of different cloud providers;
Internet. MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path.' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HypefText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
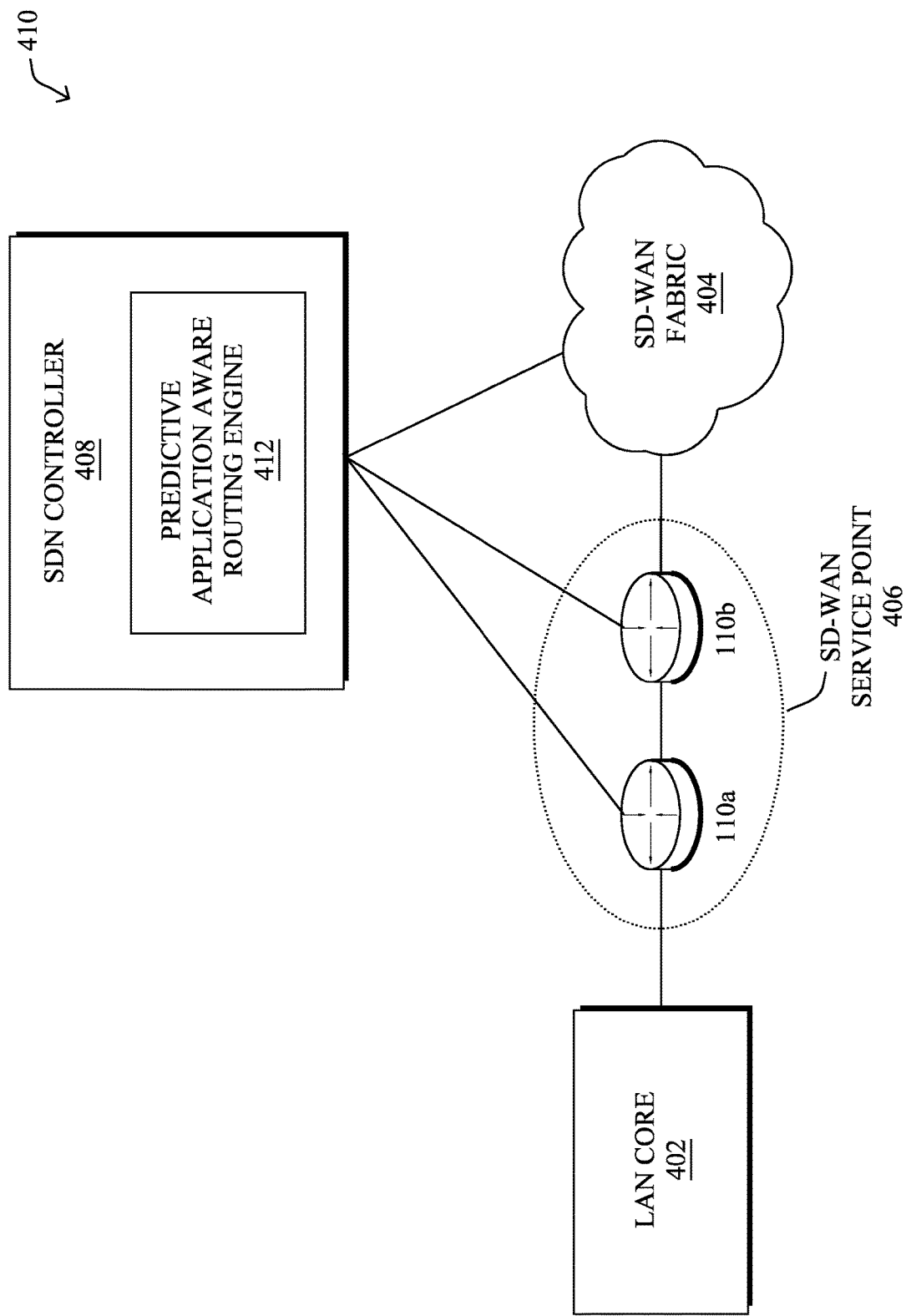

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN. Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:
1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY. MAC, etc.) independent of each other, and allowing the Internet to scale. Still, with modem applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking which focuses on single layers and poorly connect with networking actions, instead of taking a siloed approach where networking systems poorly understand user satisfaction. Cognitive Networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

Figure 5:
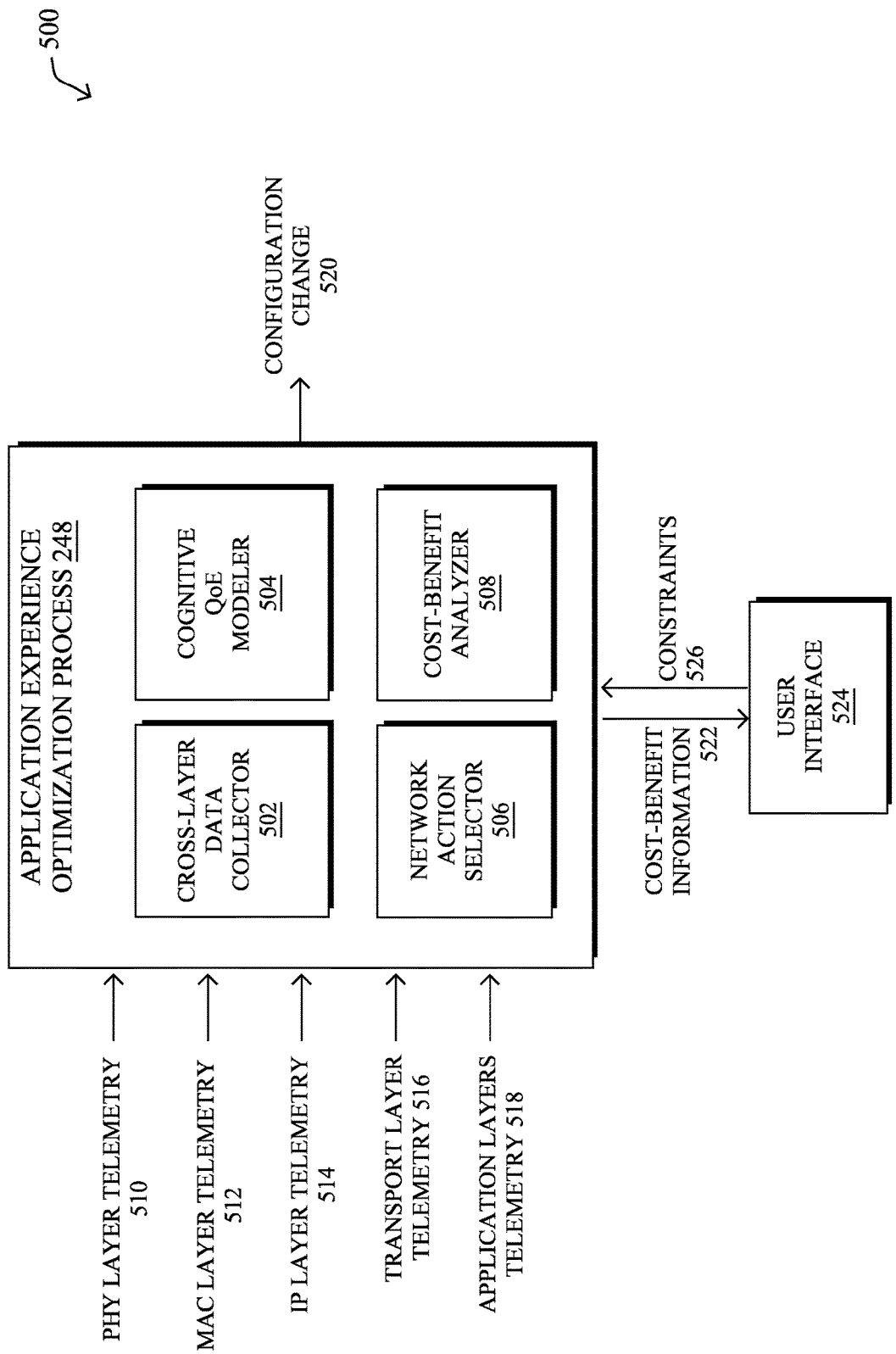
FIG. 5 illustrates an example architecture for cognitive network control.

More specifically, in some embodiments, FIG. 5 illustrates an example architecture for cognitive network control, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or any other device in a network. In some embodiments, for instance, application experience optimization process 248 may be used to implement a predictive application aware routing engine, such as predictive application aware routing engine 412, or another supervisory service for the network.

As shown, application experience optimization process 248 may include any or all of the following components: a cross-layer data collector 502, a cognitive QoE modeler 504, a network action selector 506, and/or a cost-benefit analyzer 508. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

During execution, cross-layer data collector 502 is responsible for collecting cross-layer telemetry from the network, in various embodiments. Indeed, telemetry is often now available from any or all of the various networking layers. For instance, cross-layer data collector 502 may obtain, either on a push or pull basis, any or all of the following data:
PHY layer telemetry 510—note that advanced chipset used for wireless, optical systems, and the like, are now capable of providing very fine-grained telemetry at ultra-high frequencies.
MAC layer telemetry 512
IP layer telemetry 514—e.g., based on Netflow (IPFIX) records, (fast) probes such as BFD, routing protocols Keep-Alive messaging, QoS statistics, or the like.
Transport layer telemetry 516—e.g., Application Response Time (ART) for TCP flows, etc.
Application layers telemetry 518 (e.g., telemetry from any or all of Layers 5-7 of the OSI model)—e.g., such telemetry may be based on synthetic probes (e.g. time to load a web page, etc.) or native passive probes (e.g., Waterfalls for Web applications, etc.), as well as include application-specific telemetry (e.g. hundreds of variables reported by Webex for voice and video such as Concealment Time (CT), CODEC-related variables, etc.), or even labels provided by the application itself (e.g. Microsoft O365 may report four labels such as "Good", "Degraded", "Bad", "No Opinion", etc., which may be based on feedback provided directly by the users of that application).

According to various embodiments, cognitive QoE modeler 504 is responsible for assessing the user experience of a given online application based on its associated cross-layer telemetry collected by cross-layer data collector 502. To that end, it may compute a QoE model that is typically application-specific and leverages machine learning/artificial intelligence to estimate the application QoE given a set of cross-layer telemetry for that application.

As would be appreciated, traditional approaches to estimating the application QoE have relied on relied on KPI-based formulas. For example, most NMS and assurances solutions assign an application score using weights (degree of importance) and values to networking KPI variables, to compute a score between 1 and 5. In contrast, the model of cognitive QoE modeler 504 may be trained using ground truth labels. In various embodiments, such ground truth labels may take various form such as any or all of the following:

- A number that represents the users' feedback regarding their satisfaction with their application experience (e.g., 1 to 5 "stars," as used in many systems today).
- A binary flag (e.g. "thumbs up", "thumbs down") that quantifies the users' feedback regarding their satisfaction.
- Weak signals—while direct feedback from the users of the application are strong signals as to the true QoE of the application, there may also be other weak signals, such as detected events from the cross-layer telemetry that may also indicate the QoE. For instance, events such as a user suddenly disconnecting from the application or using a different network to connect, could indicate poor QoE. Similarly, assessing a call transcript and detecting that a user said the phrase "I cannot hear you" can also indicate poor QoE.

Application experience optimization process 248 may gather such ground truth labels offline or online and at various frequencies, as well. In the offline approach, application experience optimization process 248 could solicit feedback from network experts by providing pre-recorded captures of video conferences or sets of cross-layer telemetry. In the online approach, application experience optimization process 248 could ask for live feedback from users of the application during or after completion of a given task (e.g., a call). In either case, a key aspect here is that cognitive QoE modeler 504 relies on user feedback collection, with no a priori knowledge of what drives the QoE. Note also that cognitive QoE modeler 504 may not expect the ground truth labels to be "coherent, either, accounting for some level of subjectivity or ignorance of relevant variables among the users providing feedback. For instance, users in a country where the quality of the Internet is usually poor may not provide similar feedback than users living in regions where the Internet provides high quality of service.

In various embodiments, the model of cognitive QoE modeler 504 may take the form of a Deep Neural Network (DNN), a model based on ensemble learning such as a Gradient Boosted trees (GBT), a random forest, or other form of cognitive model trained using cross-layer telemetry as input features (after potential dimensionality reduction) using the ground truth labels listed above for regression (prediction of the user experience). The end result of this training is a model that is capable of assessing the user satisfaction using cross-layer telemetry (e.g., by estimating a QoE metric based on the cross-layer telemetry).

According to various embodiments, network action selector 506 may maintain a list of networking actions that can be used by application experience optimization process 248 to optimize the QoE of the online application under scrutiny. For example, network action selector 506 may be able to tune various parameters for specific MAC layers (e.g. Wi-Fi parameters, switching, etc.), QoE parameters (e.g., the number of queues, weights to serve queues, priorities, assignment of traffic to queues, etc.), IP parameters (e.g., network topology, link bandwidths, etc.).

In some embodiments, by policy, network action selector 506 may not be allowed to select certain network actions from among the full set of possible actions. For instance, one policy may prevent network action selector 506 selecting a change to the topology of the network, while allowing it to select changes to the configured bandwidth. In another example, the policy may generally allow network action selector 506 to tune the QoS by adapting the weights, but disallow changing the priorities. In other embodiments, the subset of actions may be specific to some users or some applications.

In one embodiment, network action selector 506 may use the QoE model of cognitive QoE modeler 504 to assess the QoE and, in a second step, leverage another learning model to improve QoE. For instance, network action selector 506 could use model interpretation techniques to understand which input feature drive the QoE (e.g. for example using Shapley values) in an attempt to root-cause the QoE. Based on the importance of input features, network action selector 506 may then trigger some actions and measure their impact on QoE using reinforcement learning, for instance.

In another embodiment, network action selector 506 may make use of differentiable programming (which can be seen as a generalization of Deep Neural networks), to optimize a given variable (e.g. user satisfaction aka QoE) using as input a set of telemetry feeding a (pre-trained) DNN, itself connected to a plurality of networking actions, all functions being differentiable and using a loss function reflecting the objective (improve QoE). In such a case, the output would then be a set of networking actions that can be implemented to improve the overall user satisfaction (QoE). Thus, as a result of the selection, network action selector 506 may then send a configuration change 520 to the relevant networking device(s) to implement the selected network action.

With the emergence of Software Defined Cloud Interconnect (SDCI) and Middle Mile Optimization (MMO) it even becomes possible for network action selector 506 to provision a network on-the-fly: new nodes (virtual routers) can easily be provisioned, with dynamic topology ("virtual" links interconnecting the routers) and even dynamic bandwidth. Although application programming interfaces (APIs) do exist today to provision such networks, there are currently no utilities that provide insights as to the best topologies and resources required to optimize some variables such as the user QoE. In contrast, network action selector 506 may determine which action to takes to achieve such an objective, a fundamental paradigm shift to existing network operations.

In some embodiments, cost-benefit analyzer 508 may record each action triggered by network action selector 506 and compute the cost-benefit metrics with respect to the target variable (e.g., the QoE). For example, cost-benefit analyzer 508 may discover that changing the QoS queue weight on most WAN links had almost no cost, deteriorated by x % the level of QoE for low priority traffic, and improved the user QoE by x'%, whereas increasing the WAN link bandwidth increased the cost metric by c % but improved the QoE by z % with z>>x %. Such feedback could be used as input to network action selector 506 to help its selection of the appropriate network action.

In one embodiment, cost-benefit analyzer 508 may also provide the cost-benefit information 522 to a user interface 524, to allow a network administrator to review the cost-benefit metrics associated with the different actions. In some instances, the administrator may also specify, via user interface 524, constraints 526. In turn, network action selector 506 may use these constraints to limit the full set of possible network actions to only a subset for its selections in the future.

While the above cognitive networking approach is well suited for optimizing the application experiences of online applications accessed via an SD-WAN by signaling bypass paths and enforcing traffic steering actions via the SD-WAN fabric, there are many situations in which an online application is accessed outside of an SD-WAN (e.g., via the Internet, etc.).

Cognitive Networking Using a Device Endpoint Agent

The techniques introduced herein expand the cognitive networking approach above to end-user devices (e.g., laptops, smartphones, etc.) with the help of a software endpoint agent. In some aspects, QoE optimization actions are enforced at the very edge of the network, directly on end user devices, without the need for additional network infrastructure such as dedicated SDN routers or firewalls. However, when such devices are available, the cognitive networking controller can coordinate application forwarding decision across Endpoint Agents and the underlying SDN (SD-WAN, SDA) environment.

In further aspects, two new signaling protocols are introduced, as well. First, a Service Discovery Protocol (SDP) is described as a way to propagate control plane information between all components of the solution: controller, endpoint agents, and middle mile optimization (MMO) gateways. Second, a Bypass Forwarding Protocol (BFP) is also introduced herein to set up traffic forwarding between endpoint agents and MMO gateways using a lightweight, tunnel-less approach that eliminates the need for complicated overlay tunneling technologies such as SD-WAN or VXLAN and reducing the overall network overhead.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device makes a determination that user application experience is degraded for a client endpoint of an online application due to a current path in a network that conveys application traffic associated with the online application. A device identifies a bypass path in the network for the application is traffic. The device provisions an optimization gateway along the bypass path to forward the application traffic from the client endpoint to the online application. The device causes an endpoint agent executed by the client endpoint to send the application traffic to the optimization gateway for forwarding to the online application via the bypass path.

Figure 6:
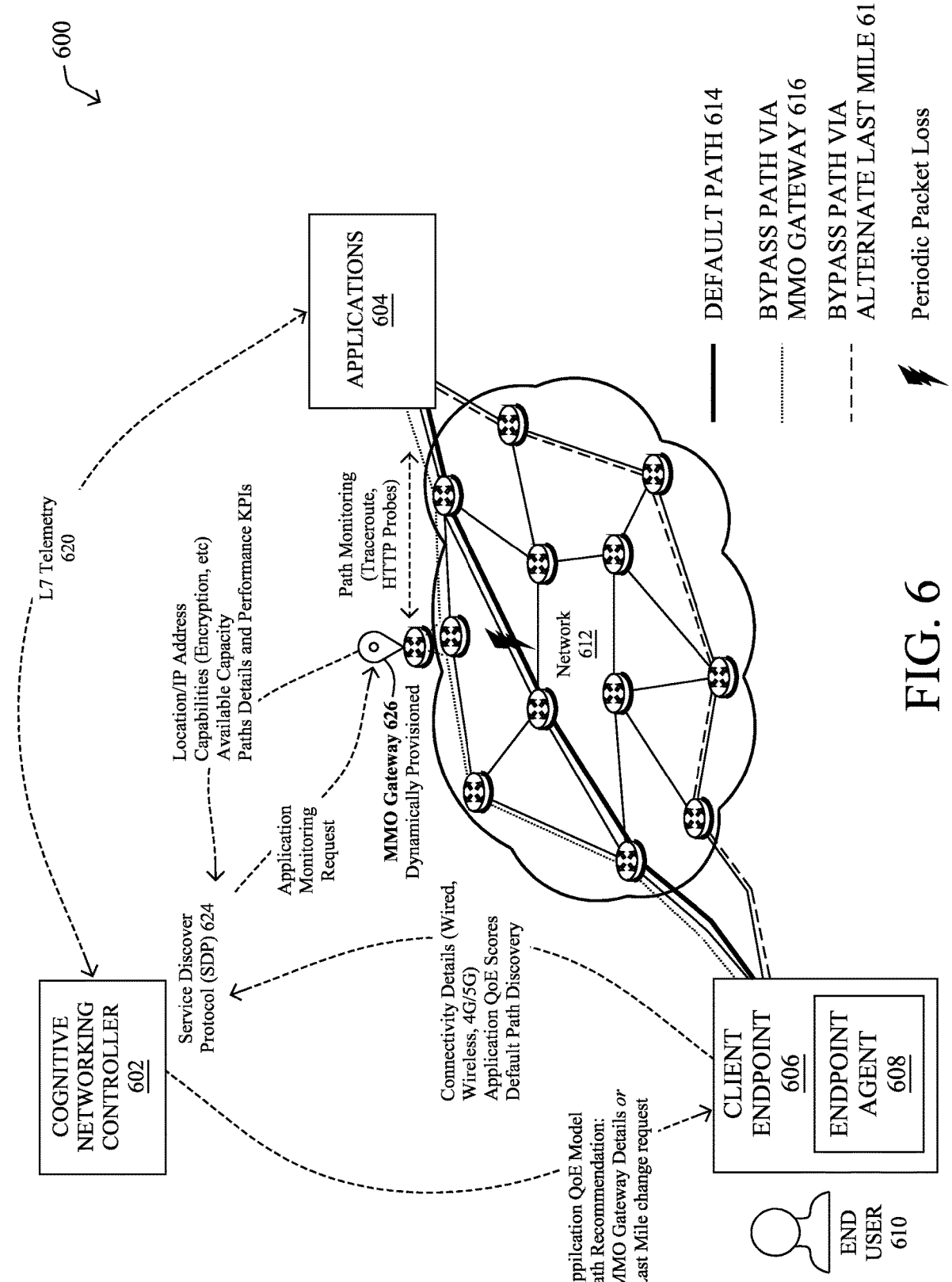
FIG. 6 illustrates an example cognitive network with an endpoint agent.

Operationally, FIG. 6 illustrates an example cognitive network 600 with an endpoint agent, according to various embodiments. More specifically, as shown, assume that there are any number of online applications 604 accessible to a client endpoint 606 operated by an end user 610 via a network 612, such as the Internet or other such network.

According to various embodiments, cognitive network 600 may include a cognitive networking controller 602, which may be implemented through execution of a specialized form of application experience optimization process 248 adapted to perform the functions described below. At a high level, cognitive networking controller 602 may be responsible for generating QoE optimizations actions in cognitive network 600.

For instance, assume that client endpoint 606 exchanges traffic with a given online application in online applications 604 via a default path 614 extending through network 612. However, default path 614 exhibits periodic packet loss, thereby resulting in a drop in the QoE of the online application from the perspective of end user 610. Cognitive networking controller 602 may detect such an impact on the QoE based on Layer 7 telemetry 620 from the application itself, and/or network metrics (e.g., Layer 3 metrics) collected from network 612.

As detailed below, in the case of the default path causing poor application QoE, cognitive networking controller 602 may provision a new Middle Mile Optimization (MMO) gateway 626 to act as a bypass, in some embodiments. That is, rather than continuing to route the application traffic via default path 614, the traffic could instead be sent via a bypass path 616 that includes MMO gateway 626, to avoid the packet loss along default path 614 and improve the QoE of the corresponding application.

According to various embodiments, cognitive networking controller 602 may operate in conjunction with any number of endpoint agents, such as endpoint agent 608 executed by endpoint 606. To do so, cognitive networking controller 602 may utilize a Session Discovery Protocol (SDP) 624, whose role it is to set up an encrypted communication channel between the various entities shown (e.g., endpoint agent 608, cognitive networking controller 602, MMO Gateway 626, etc.). For instance, such encryption could take the form of Transport Layer Security (TLS), Datagram TLS (DTLS), or other suitable encryption mechanism, to implement control state propagation between these entities.

Figure 7:
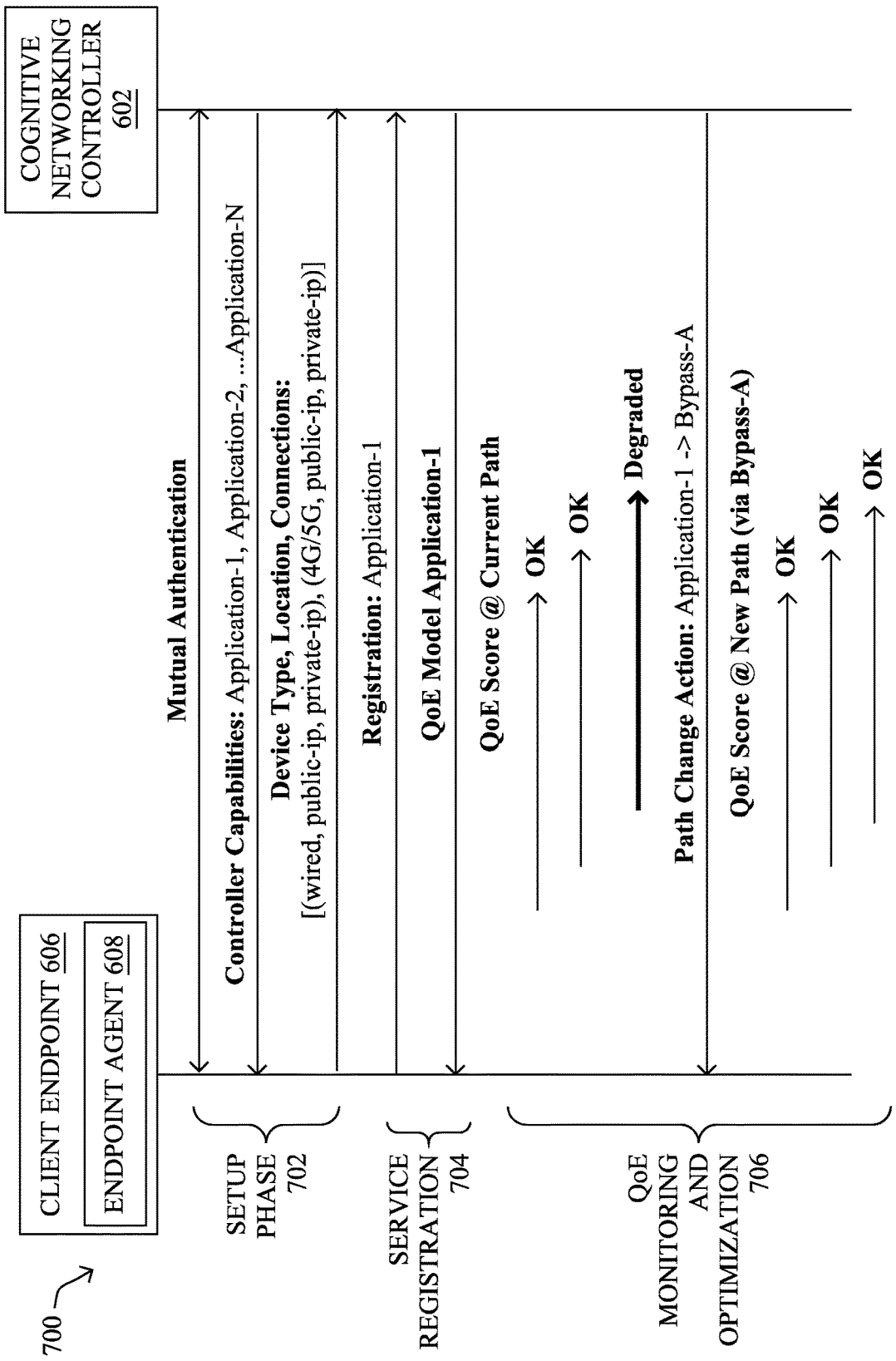
FIG. 7 illustrates an example diagram of communications between an endpoint agent and a controller.

FIG. 7 illustrates an example diagram 700 of communications between endpoint agent 608 on client endpoint 606 and cognitive networking controller 602 using SDP 624. As shown, the communications between these two entities may be performed in phases: an initial setup phase 702, a service registration phase 704, and a QoE monitoring and optimization phase 706.

During setup phase 702, cognitive networking controller 602 and endpoint agent 608 may mutually authenticate each other and begin to exchange information. Then, cognitive networking controller 602 may advertise to endpoint agent 608 a list of applications or services for which pre-trained QoE models exist and, thus, optimization is possible. In addition, during setup phase 702, endpoint agent 608 may send to cognitive networking controller 602 any or all of the following connectivity details for client endpoint 606:

Client metadata information (e.g., a device type of client endpoint 606, the version of endpoint agent 608, etc.).
Location information for client endpoint 606.
The network connections/interfaces available to client endpoint 606 (e.g., wired, wireless, 4/5G cellular, etc.).
Public and/or private IP address information for each connection.

Once setup phase 702 is complete, endpoint agent 608 and cognitive networking controller 602 may move on to service registration phase 704, the goal of which is to register endpoint agent 608 for QoE optimization with respect to any number of online applications for which optimization is supported by cognitive networking controller 602. To this end, endpoint agent 608 may send a collective request or a separate request for each desired application. In turn, cognitive networking controller 602 may return a corresponding QoE model for each requested application. In some instances, different QoE inference strategies may be used for different applications, driven by considerations related to how and where the application telemetry is collected. As such, on a per application basis, cognitive networking controller 602 may respond to a registration request from endpoint agent 608 with any of the following, depending on the circumstances:

Acknowledgment and QoE Model: for some applications, endpoint agent 608 itself may be able to collect the appropriate telemetry for input to a QoE prediction model, which cognitive networking controller 602 may push to endpoint agent 608 for execution. This allows endpoint agent 608 to locally make QoE predictions for a given application, without the need to stream vast amounts of telemetry to cognitive networking controller 602. This may be the case, for instance, with web-based applications where a browser extension could directly collect telemetry such as HTTP and page load statistics.

Acknowledgment without a QoE Model: for collaboration applications, performance telemetry (e.g., telemetry 620 in FIG. 6) may be provided by the application vendor (e.g., Webex, Zoom, Microsoft) without any assistance from endpoint agent 608, in which case cognitive networking controller 602 can directly evaluate the QoE of that application on its side. In this case, there is no need for cognitive networking controller 602 to publish a QoE model to endpoint agent 608.

Acknowledgment with Telemetry Request: cognitive networking controller 602 and endpoint agent 608 could also employ a hybrid approach, as well, whereby endpoint agent 608 collects some telemetry locally and cognitive networking controller 602 collects other telemetry. In turn, cognitive networking controller 602 may perform the QoE predictions by requesting certain telemetry metrics from endpoint agent 608.

Once service registration phase 704 is complete, QoE monitoring and optimization phase 706 can start. During this phase, cognitive networking controller 602 and/or endpoint agent 608 may continuously compute application QoE scores for the corresponding application(s). When the QoE scores for a given application point to its user experience being degraded, cognitive networking controller 602 may then generate a path change recommendation.

While not shown in FIG. 7, cognitive networking controller 602 may also instruct endpoint agent 608 to perform a set of actions that aid in determining the optimal alternate path such as: running traceroutes to a set of potential bypass nodes to discover the underlay topology, running bandwidth tests, or the like. In other cases, cognitive networking controller 602 may utilize information collected from other endpoint agents and skip some or all of these steps. For example, if several users in the same network range experience poor QoE, cognitive networking controller 602 only needs to discover the optimal bypass path once and recommend it to all the affected users. Such decision criteria may be driven according to the experienced QoE, number of users, user profiles (requiring minimum QoE for some applications), etc.

Figure 8:
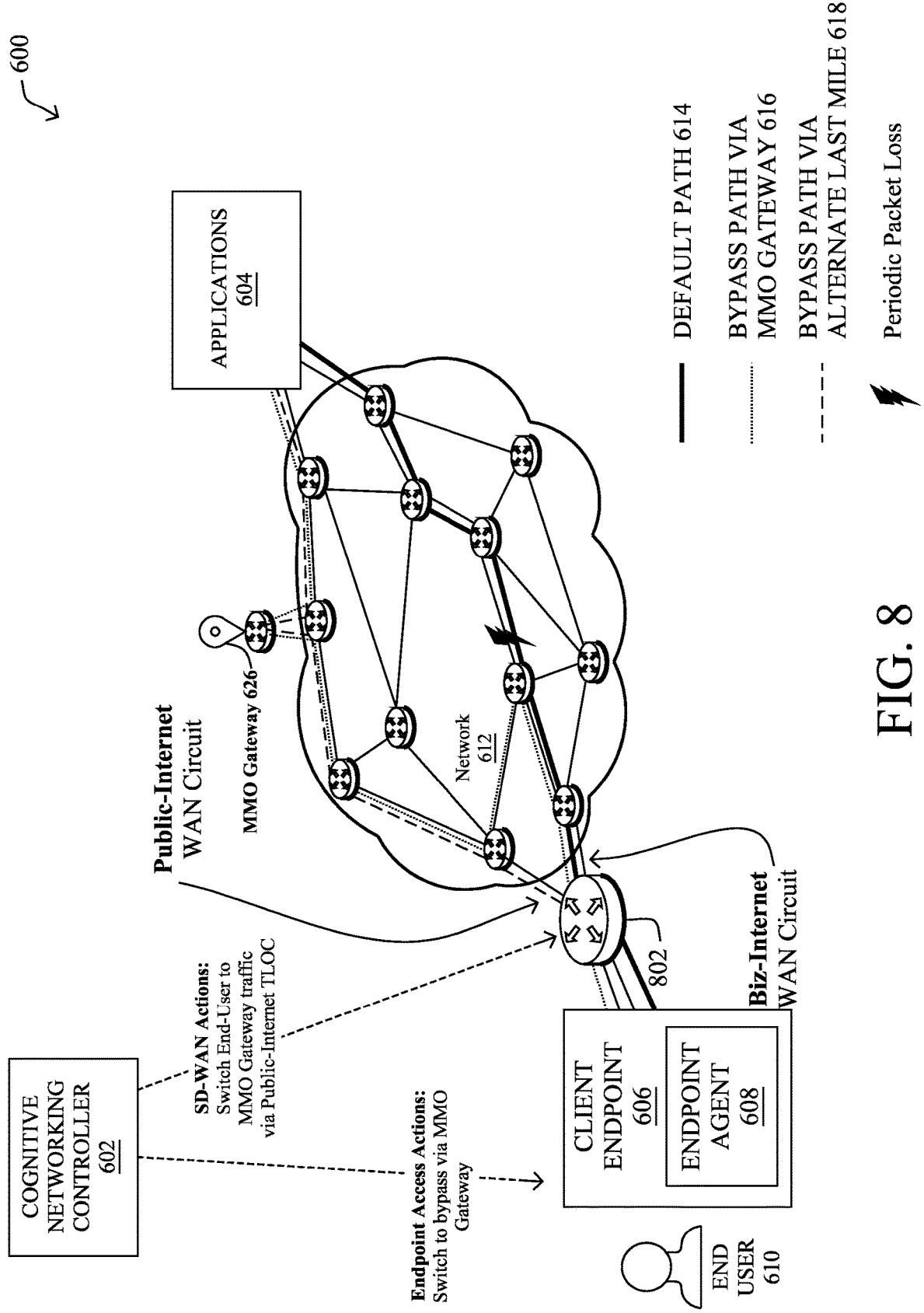
FIG. 8 illustrates an example of the controller in cognitive network of FIG. 6 making traffic adjustments.

FIG. 8 illustrates an example of cognitive networking controller 602 in cognitive network 600 making traffic adjustments, according to various embodiments. Optionally, one function of cognitive networking controller 602 is to coordinate traffic forwarding actions between endpoint agents, such as endpoint agent 608, and SD-WAN routers, whenever they are available.

As shown in FIG. 8, assume that client endpoint 606 is connected behind an SD-WAN device and, by default, traffic between client endpoint 606 and number of online applications 604 is routed over a Biz-Internet connection. During a period of QoE degradation, cognitive networking controller 602 may issue a switch-to-bypass action to the endpoint agent 608, which triggers traffic to be rerouted to MMO gateway 626 via bypass path 616. In a second step, cognitive networking controller 602 could identify that path between client endpoint 606 and the MMO gateway 626 can be optimized by requesting SD-WAN router 802 to switch this traffic to the Public Internet WAN Circuit, shown as bypass path 618.

According to various embodiments, cognitive networking controller 602 may dynamically instantiate MMO gateway 626 in a public or private cloud location (e.g., AWS, GCP, Azure) or using SDCI services (e.g., Equinix, Megaport), which acts as a network proxy to help avoid problematic areas in the topology of network 612 (e.g., the Internet). In addition, MMO gateway 626 may also report various information back to cognitive networking controller 602, such as its location or IP address, capabilities (e.g., encryption type, etc.), available capacity, path details and performance KPIs, etc. For instance, cognitive networking controller 602 may request application performance monitoring for a particular application in applications 604. In turn, MMO gateway 626 may perform path monitoring between itself and that application, to report the measured path metrics back to cognitive networking controller 602 for analysis.

In some embodiments, another function of endpoint agent 608 may be to perform application recognition on client endpoint 606. To do so, endpoint agent 608 may employ an application recognition function such as Cisco's Network Based Application Recognition (NBAR) or Enea's Qosmos, which are commonly deployed today to network equipment such as firewalls or SD-WAN routers. In recent years, lightweight versions of such recognition engines have been developed in the form of SDKs and can now be easily integrated into a range of software-based solutions such as endpoint agent 608.

As noted above, another potential function of endpoint agent 608 may be to facilitate telemetry collection from client endpoint 606. To do so, cognitive networking controller 602 may request that client endpoint 606 collect, on-demand or periodically, information pertaining to the connection details (wireless or 4G/5G signal strength, interface errors, etc., available bandwidth), CPU, memory and/or disk load of client endpoint 606, application version numbers, or the like. Using additional sub-modules such as browser extensions, endpoint agent 608 may also collect browser statistics or other types of telemetry, as well.

Finally, endpoint agent 608 may be responsible for implementing the QoE optimization actions signaled by cognitive networking controller 602. Multiple types of actions may be provided such as any or all of the following, among others:

Outgoing interface change: Here, cognitive networking controller 602 may instruct endpoint agent 608 to forward specific applications over different outgoing interfaces or networks. For example, if the wireless connection is determined to cause poor QoE scores, cognitive networking controller 602 may request that endpoint agent 608 switch critical application traffic over to a 5G cellular connection.

Path re-route (bypass): Here, cognitive networking controller 602 may instruct endpoint agent 608 to use an MMO gateway as proxy for forwarding application traffic.

When a bypass path is required, application traffic needs to be forwarded via one or more MMO Gateways before it finally reaches the destination application. This could be achieved by encapsulating/decapsulating the original packet using an overlay technology such as IPSec, GRE, SD-WAN, VxLAN, or the like. However, doing so also comes with some drawbacks in terms of: 1.) network overhead as additional headers are inserted in the packet which can amount to significant bandwidth consumption especially for small packet sizes (e.g., voice traffic encapsulated in IPsec over GRE) and 2.) CPU/memory overhead as additional headers need to be inserted and various checksums recalculated for each packet. The overlay approach may work well in the case of single tunnel use cases, such a single VPN gateway), but does not scale well where endpoint agent 608 may use multiple MMO gateways at the same time.

According to various embodiments, a Bypass Forwarding Protocol (BFP) in introduced herein, to achieve tunnel-less path engineering between endpoint agents and applications (via MMO gateways) or, alternatively, tunneled to the MMO gateway. In general, BFP makes use of techniques similar to those used by network address translation (NAT) to perform IP header rewrite operations on both the endpoint agent and the MMO gateway in order to perform path engineering.

Figure 9:
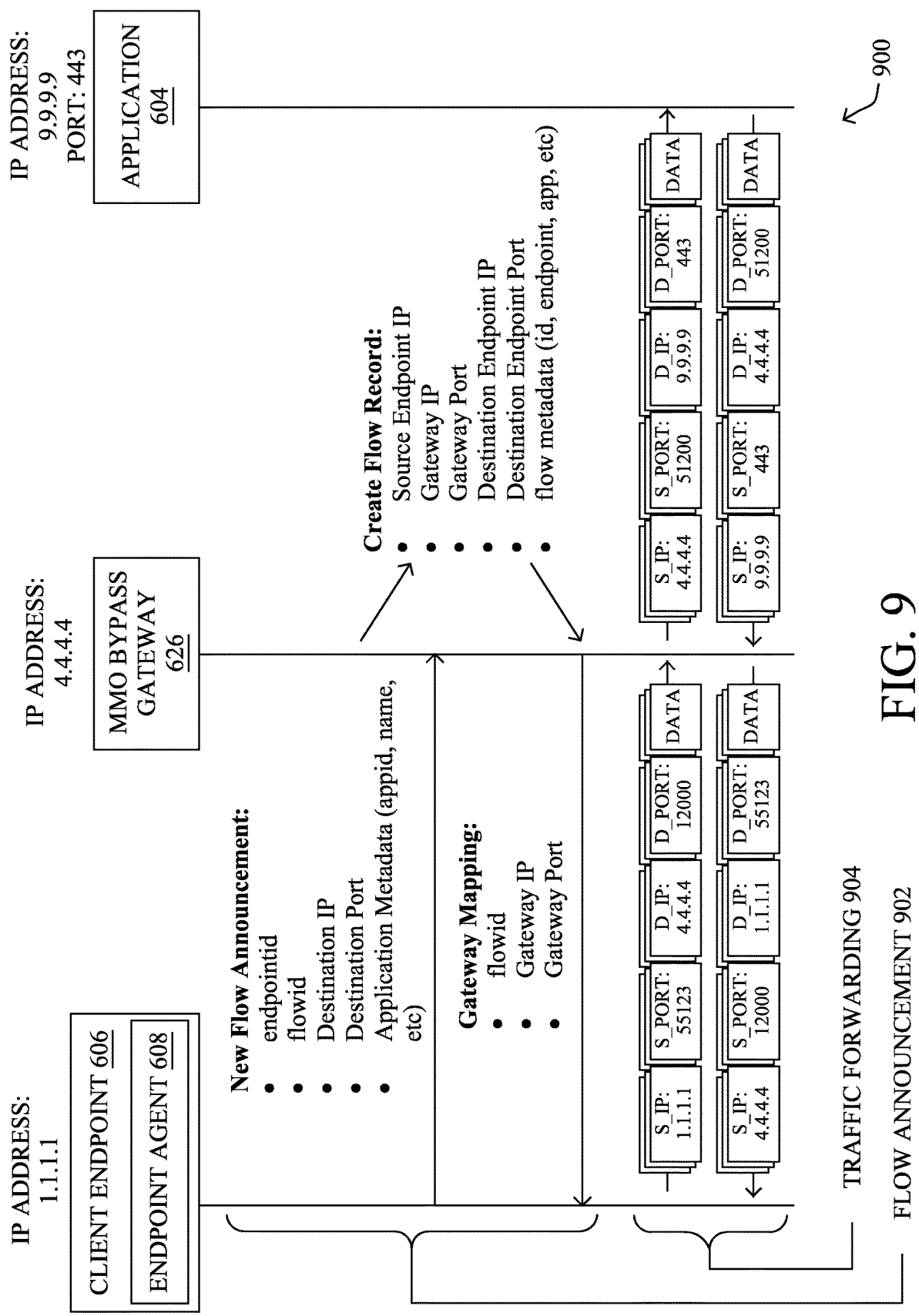
FIG. 9 illustrates an example of an endpoint agent signaling use of a bypass path.

FIG. 9 illustrates an example diagram 900 of endpoint agent 608 signaling use of a bypass path using BFP, according to various embodiments. Here, the traffic forwarding can be performed in two phases: a first, flow announcement phase 902 and then a second, traffic forwarding phase 904.

During flow announcement phase 902 and using BFP, endpoint agent 608 may advertise to MMO gateway 626 the existence of a new TCP or UDP flow that needs to be rerouted and include details such as: endpoint, flowID, application name, destination IP and Port, application metadata (e.g., appID, name, etc.). In turn, MMO gateway 626 creates an internal flow record that consists of the public IP address of client endpoint 606, a locally designated port number and, optionally, a local IP address (there should more than one be available). Once endpoint agent 608 receives the mapping details from MMO gateway 626, it is ready to rewrite the IP headers and forward traffic through the gateway.

Endpoint agent 608 and MMO gateway 626 may perform a flow announcement handshake using a dedicated set of packets or optionally using a metadata header. Using the second approach, packets can be immediately forwarded through the gateway, without having to way for a dedicated handshake sequence to complete.

Once the flow has been announced and gateway mapping established, endpoint agent 608 and MMO gateway 626 may move on to traffic forwarding phase 904. During this phase, endpoint agent 608 may cause client endpoint 606 to forward the traffic for the affected application to MMO gateway 626 (e.g., using the destination IP address and port of MMO gateway 626 instead of that of application 604). In turn, MMO gateway 626 may forward the traffic on to application 604 using its own address and port for the source and the address and port of application 604. On the reverse path, MMO gateway 626 may perform a similar mapping, to forward the traffic in the reverse direction back to client endpoint 606.

In some embodiments, a lightweight path keepalive mechanism may also be implemented to ensure path continuity between endpoint agent 608 and MMO gateway 626. Protocols such as BFD, TWAMP or IPSLA can be reused for this purpose.

In addition, endpoint agent 608 and MMO gateway 626 may maintain the flow records until 1.) flows get terminated (RST, FIN), such as in the case of TCP or after a certain period of inactivity for UDP, 2.) path continuity check fails, or 3.) the CNC controller pushes a new path action.

Optionally, an encryption scheme can also be devised such as traffic between the endpoint and gateway is encrypted with the Session Advertisement Protocol (SDP) providing an off-path encryption key distribution mechanism.

Figure 10:
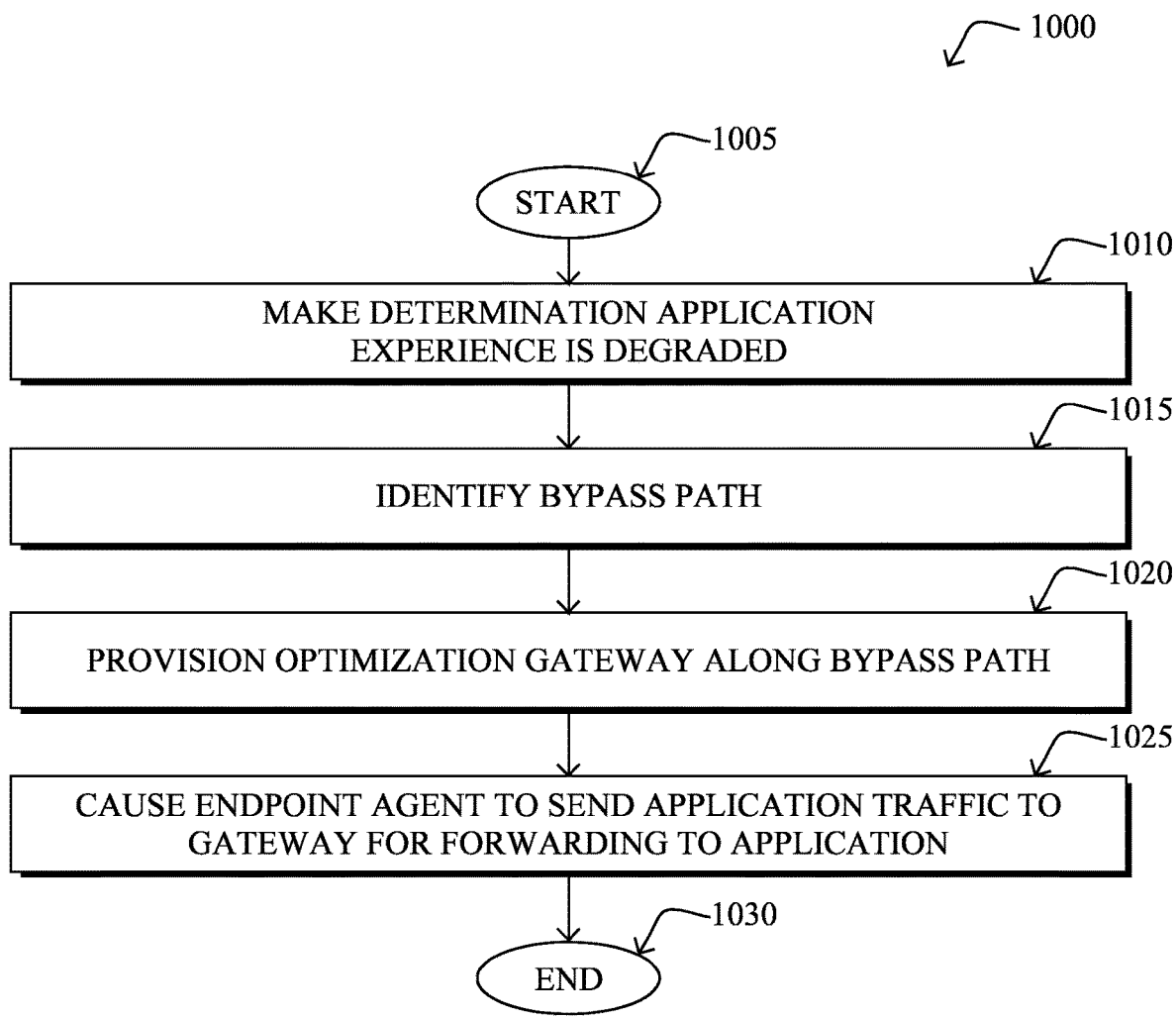
FIG. 10 illustrates an example simplified procedure for cognitive networking using an endpoint agent.

FIG. 10 illustrates an example simplified procedure (e.g., a method) for cognitive networking using an endpoint agent, in accordance with one or more embodiments described herein. For example, a non-generic, specifically configured controller for a network (e.g., device 200) may perform procedure 1000 by executing stored instructions (e.g., application experience optimization process 248). The procedure 1000 may start at step 1005, and continues to step 1010, where, as described in greater detail above, the device may make a determination that user application experience is degraded for a client endpoint of an online application due to a current path in a network that conveys application traffic associated with the online application. In some embodiments, the controller may do so by using telemetry data reported by the endpoint agent as input to a prediction model that predicts an application experience for the online application. In further embodiments, the controller may do so by receiving, from the endpoint agent, an indication that a prediction model deployed to the client endpoint has predicted degraded application experience for the online application. In one embodiment, the controller may also deploy the prediction model to the client endpoint, based on an indication of telemetry metrics available to the endpoint agent.

At step 1015, as detailed above, the controller may identify a bypass path in the network for the application traffic. In some embodiments, the controller may also perform a registration exchange with the endpoint agent during which the endpoint agent reports available connection types and address information of the client endpoint to the apparatus.

At step 1020, the controller may provision an optimization gateway along the bypass path to forward the application traffic from the client endpoint to the online application, as described in greater detail above. In one embodiment, the controller may do so by configuring the optimization gateway to translate a destination address and a destination port indicated by the application traffic into a destination address and a destination port associated with the online application. In further embodiments, the optimization gateway is a software-defined networking entity. In another embodiment, the controller may also receive path metrics from the optimization gateway obtained by the optimization gateway by probing a portion of the bypass path between the optimization gateway and the online application.

At step 1025, as detailed above, the controller may cause an endpoint agent executed by the client endpoint to send the application traffic to the optimization gateway for forwarding to the online application via the bypass path. In some embodiments, the controller may do so by providing address and port information for the optimization gateway to the endpoint agent, wherein the endpoint agent uses that address and port information to send the application traffic to the optimization gateway. In one embodiment, the endpoint agent announces a new flow of the application traffic to the optimization gateway, prior to sending the application traffic to the optimization gateway.

Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for cognitive networking using an endpoint agent, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    making, by a controller in a network, a determination that user application experience is degraded for a client endpoint of an online application due to a current path in the network that conveys application traffic associated with the online application;
    identifying, by the controller, a bypass path in the network for the application traffic;
    provisioning, by the controller, an optimization gateway along the bypass path to forward the application traffic from the client endpoint to the online application; and
    causing, by the controller, an endpoint agent executed by the client endpoint to announce a new flow of the application traffic to the optimization gateway then send the application traffic to the optimization gateway for forwarding to the online application via the bypass path.

2. The method as in claim 1, wherein making the determination comprises:
    using, by the controller, telemetry data reported by the endpoint agent as input to a prediction model that predicts an application experience for the online application.

3. The method as in claim 1, wherein making the determination comprises:
    receiving, from the endpoint agent, an indication that a prediction model deployed to the client endpoint has predicted degraded application experience for the online application.

4. The method as in claim 3, further comprising:
    deploying, by the controller, the prediction model to the client endpoint, based on an indication of telemetry metrics available to the endpoint agent.

5. The method as in claim 1, wherein provisioning optimization gateway along the bypass path to forward the application traffic from the client endpoint to the online application comprises:
    configuring the optimization gateway to translate a destination address and a destination port indicated by the application traffic into a destination address and a destination port associated with the online application.

6. The method as in claim 1, further comprising:
    performing, by the controller, a registration exchange with the endpoint agent during which the endpoint agent reports available connection types and address information of the client endpoint to the controller.

7. The method as in claim 1, wherein the optimization gateway is a software-defined networking entity.

8. The method as in claim 1, wherein causing the endpoint agent executed by the client endpoint to send the application traffic to the optimization gateway for forwarding to the online application via the bypass path comprises:
    providing, by the controller, address and port information for the optimization gateway to the endpoint agent, wherein the endpoint agent uses that address and port information to send the application traffic to the optimization gateway.

9. The method as in claim 1, further comprising:
    receiving, at the controller, path metrics from the optimization gateway obtained by the optimization gateway by probing a portion of the bypass path between the optimization gateway and the online application.

10. An apparatus, comprising:
    one or more network interfaces;
    a processor coupled to the one or more network interfaces and configured to execute one or more processes; and
    a memory configured to store a process that is executable by the processor, the process when executed configured to:
        make a determination that user application experience is degraded for a client endpoint of an online application due to a current path in a network that conveys application traffic associated with the online application;
        identify a bypass path in the network for the application traffic;
        provision an optimization gateway along the bypass path to forward the application traffic from the client endpoint to the online application; and
        cause an endpoint agent executed by the client endpoint to announce a new flow of the application traffic to the optimization gateway then send the application traffic to the optimization gateway for forwarding to the online application via the bypass path.

11. The apparatus as in claim 10, wherein making the determination comprises:
    using telemetry data reported by the endpoint agent as input to a prediction model that predicts an application experience for the online application.

12. The apparatus as in claim 10, wherein making the determination comprises:
    receiving, from the endpoint agent, an indication that a prediction model deployed to the client endpoint has predicted degraded application experience for the online application.

13. The apparatus as in claim 12, wherein the process when executed is further configured to:
deploy the prediction model to the client endpoint, based on an indication of telemetry metrics available to the endpoint agent.

14. The apparatus as in claim 10, wherein the apparatus provisions the optimization gateway along the bypass path to forward the application traffic from the client endpoint to the online application by:
configuring the optimization gateway to translate a destination address and a destination port indicated by the application traffic into a destination address and a destination port associated with the online application.

15. The apparatus as in claim 10, wherein the process when executed is further configured to:
perform a registration exchange with the endpoint agent during which the endpoint agent reports available connection types and address information of the client endpoint to the apparatus.

16. The apparatus as in claim 10, wherein the optimization gateway is a software-defined networking entity.

17. The apparatus as in claim 10, wherein the apparatus causes the endpoint agent executed by the client endpoint to send the application traffic to the optimization gateway for forwarding to the online application via the bypass path by:
provide address and port information for the optimization gateway to the endpoint agent, wherein the endpoint agent uses that address and port information to send the application traffic to the optimization gateway.

18. A tangible, non-transitory, computer-readable medium storing program instructions that cause a controller in a network to execute a process comprising:
making, by the controller in the network, a determination that user application experience is degraded for a client endpoint of an online application due to a current path in the network that conveys application traffic associated with the online application;
identifying, by the controller, a bypass path in the network for the application traffic;
provisioning, by the controller, an optimization gateway along the bypass path to forward the application traffic from the client endpoint to the online application; and
causing, by the controller, an endpoint agent executed by the client endpoint to announce a new flow of the application traffic to the optimization gateway then send the application traffic to the optimization gateway for forwarding to the online application via the bypass path.

* * * * *

UNITED STATES PATENT AND TRADEMARK OFFICE
CERTIFICATE OF CORRECTION

PATENT NO. : 12,047,425 B1  
APPLICATION NO. : 18/198565  
DATED : July 23, 2024  
INVENTOR(S) : Eduard Schornig et al.

Page 1 of 1

It is certified that error appears in the above-identified patent and that said Letters Patent is hereby corrected as shown below:

In the Specification

Column 9, Line 1 please amend as shown:
vary with the region, SP, access type, as well as over time Column 9, Line 40 please amend as shown:
QoE by sending HyperText Transfer Protocol (HTTP)

Column 11, Line 42 please amend as shown:
allowing the Internet to scale. Still, with modern applications Column 15, Line 50 please amend as shown:
bypass path in the network for the application traffic. The Signed and Sealed this  
First Day of October, 2024

Katherine Kelly Vidal  
*Director of the United States Patent and Trademark Office*